United States Patent
Sunohara et al.

(10) Patent No.: US 6,724,457 B1
(45) Date of Patent: Apr. 20, 2004

(54) LIQUID CRYSTAL DISPLAY DEVICE AND METHOD OF MANUFACTURING THE SAME

(75) Inventors: Kazuyuki Sunohara, Fukaya (JP); Atsuyuki Manabe, Fukaya (JP); Hiroyuki Nagata, Kumagaya (JP); Natsuko Maya, Fukaya (JP); Akiko Toriyama, Kumagaya (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 285 days.

(21) Appl. No.: 09/708,592

(22) Filed: Nov. 9, 2000

(30) Foreign Application Priority Data

Nov. 9, 1999  (JP) ............................................ 11-318820

(51) Int. Cl.⁷ .......................................... G02F 1/1339
(52) U.S. Cl. ...................................................... 349/155
(58) Field of Search .......................................... 349/155

(56) References Cited

U.S. PATENT DOCUMENTS 5,499,128 A * 3/1996 Hasegawa et al. .......... 349/155
6,238,754 B1 * 5/2001 Shohara et al. .......... 252/299.5

FOREIGN PATENT DOCUMENTS

JP           9-120075           5/1997

* cited by examiner

Primary Examiner—Tarifur R. Chowdhury
Assistant Examiner—P. R. Akkapeddi
(74) Attorney, Agent, or Firm—Pillsbury Winthrop, LLP

(57) ABSTRACT

A liquid crystal display device comprises a first substrate, a columnar spacer formed on the first substrate and exhibiting light shielding properties, an alignment film formed to covet at least a part of the columnar spacer, a second substrate arranged to face the first substrate with a predetermined gap provided by the columnar spacer between the first and second substrates, and a liquid crystal material arranged within the gap. The columnar spacer is tapered in the forward direction as viewed from the first substrate in that portion of the columnar spacer which is positioned closest to the second substrate and has the largest diameter portion in the region other than that region of the columnar spacer which is positioned closest to the first substrate.

8 Claims, 2 Drawing Sheets

LIQUID CRYSTAL DISPLAY DEVICE AND METHOD OF MANUFACTURING THE SAME

CROSS-REFERENCE TO RELATED APPLICATIONS

This application is based upon and claims the benefit of priority from the prior Japanese Patent Application No. 11-318820, filed Nov. 9, 1999, the entire contents of which are incorporated herein by reference.

BACKGROUND OF THE INVENTION

The present invention relates to a liquid crystal display device and a method of manufacturing the same, particularly, to the construction of a columnar spacer for forming a predetermined gap between a pair of substrates and a method of manufacturing the columnar spacer.

A liquid crystal display device comprises a liquid crystal material held between a pair of an array substrate and a counter substrate each having an electrode. In order to maintain constant the gap between these two substrates, plastic beads having a uniform particle diameter are dispersed as a spacer between the two substrates.

In the manufacturing process of such a liquid crystal display device, the plastic beads used as a spacer are dispersed on the substrate, with the result that the spacer forms particles contaminating the manufacturing line so as to bring about a defect. Also, the spacer present in the pixel portion causes a poor alignment. Further, an agglomerated lump of the spacer and the nonuniformity in the dispersing density cause an inconvenience that the gap provided between the paired substrates is rendered nonuniform.

In order to overcome the difficulties described above, it is proposed to employ a photolithography process for forming a columnar spacer in a predetermined position on the array substrate.

However, in the manufacturing process of the array substrate, a material of an alignment film is formed after formation of a columnar spacer on the substrate, followed by applying an aligning treatment to the material of the alignment film. As a result, a problem is generated that the columnar spacer tends to be peeled off together with the alignment material formed into a film. Where the material of the alignment film is peeled off, the alignment of the liquid crystal molecules is disturbed in the vicinity of the columnar spacer, leading to deterioration in the display performance and to reduction in the manufacturing yield.

BRIEF SUMMARY OF THE INVENTION

An object of the present invention, which has been achieved in an attempt to overcome the problems described above, is to provide a liquid crystal display device satisfactory in the display performance and capable of preventing the reduction in the manufacturing yield and to provide a method of manufacturing the particular liquid crystal display device.

According to a first aspect of the present invention, there is provided a liquid crystal display device, comprising:
a first substrate;
a columnar spacer formed on the first substrate and exhibiting light shielding properties;
an alignment film formed to cover at least a part of the columnar spacer;
a second substrate arranged to face the first substrate with a predetermined gap provided by the columnar spacer between the first and second substrates; and
a liquid crystal material arranged within the gap;
wherein the columnar spacer is tapered in the forward direction as viewed from the first substrate in that portion of the columnar spacer which is positioned closest to the second substrate and has the largest diameter portion in the region other than that region of the columnar spacer which is positioned closest to the first substrate.

According to a second aspect of the present invention, there is provided a method of manufacturing a liquid crystal display device, comprising:
a first step of forming a columnar spacer on a first substrate;
a second step of forming an alignment film on the first substrate on which the columnar spacer is formed;
a third step of applying a rubbing treatment to the alignment film; and
a fourth step of arranging the first substrate and the second substrate to face each other and arranging a liquid crystal material in a gap formed between the first and second substrates by the columnar spacer;
wherein the columnar spacer in the first step is tapered in the forward direction as viewed from the first substrate in that portion of the columnar spacer which is positioned closest to the second substrate and has the largest diameter portion in the region other than that region of the columnar spacer which is positioned closest to the first substrate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A liquid crystal display device and a method of manufacturing a liquid crystal display device according to one embodiment of the present invention will now be described with reference to the accompanying drawings.

Figure 1:
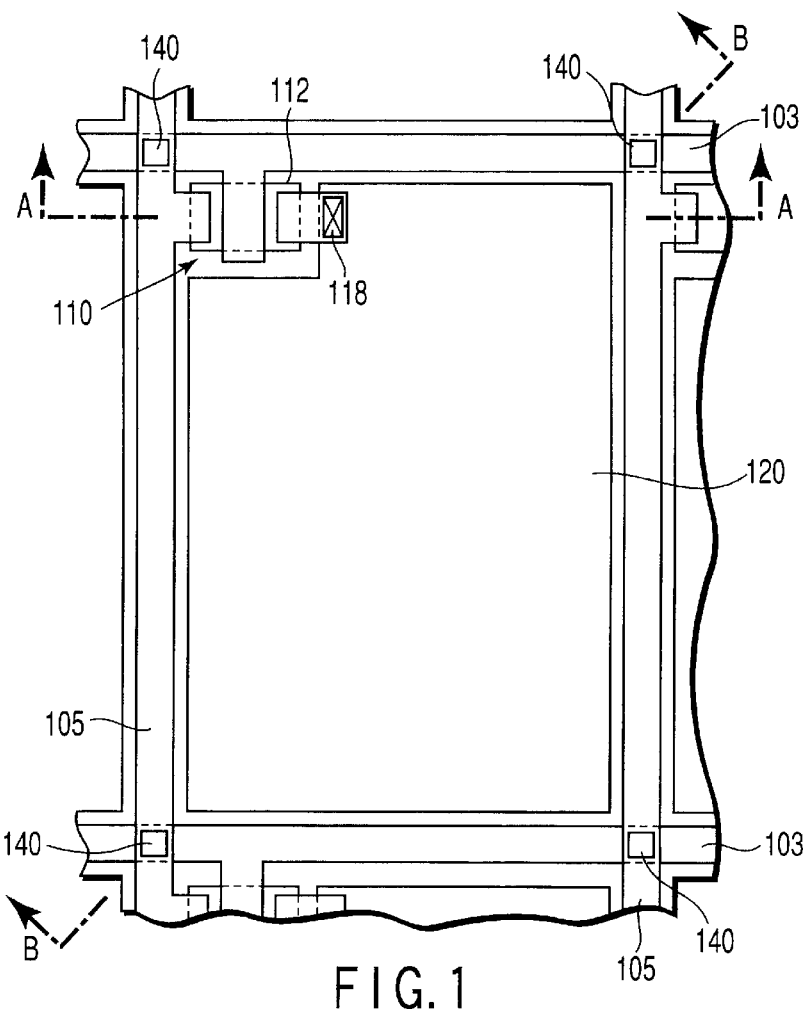
FIG. 1 is a plan view schematically showing the construction of an array substrate used in a liquid crystal display device of the present invention.
Figure 2:
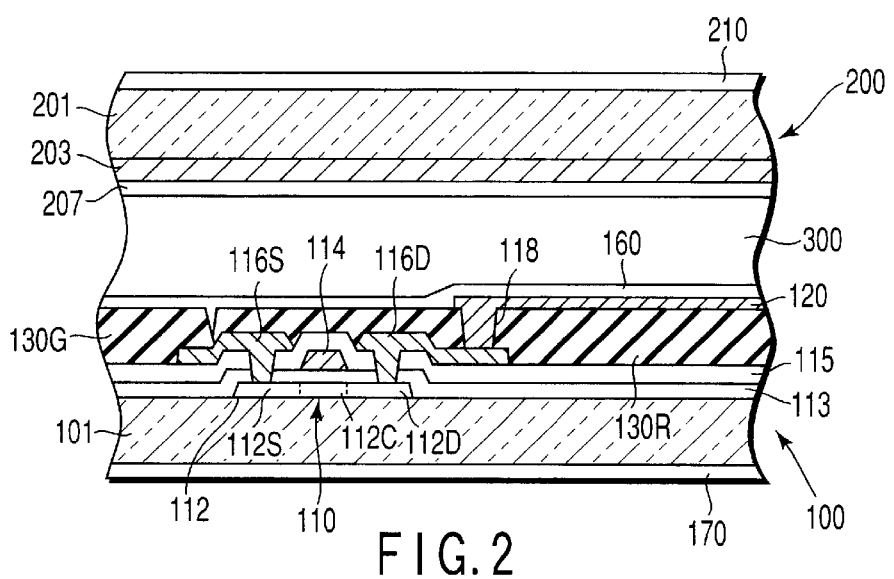
FIG. 2 is a cross sectional view along the line A—A shown in FIG. 1, which is directed to a liquid crystal display device according to a first embodiment of the present invention.
Figure 3:
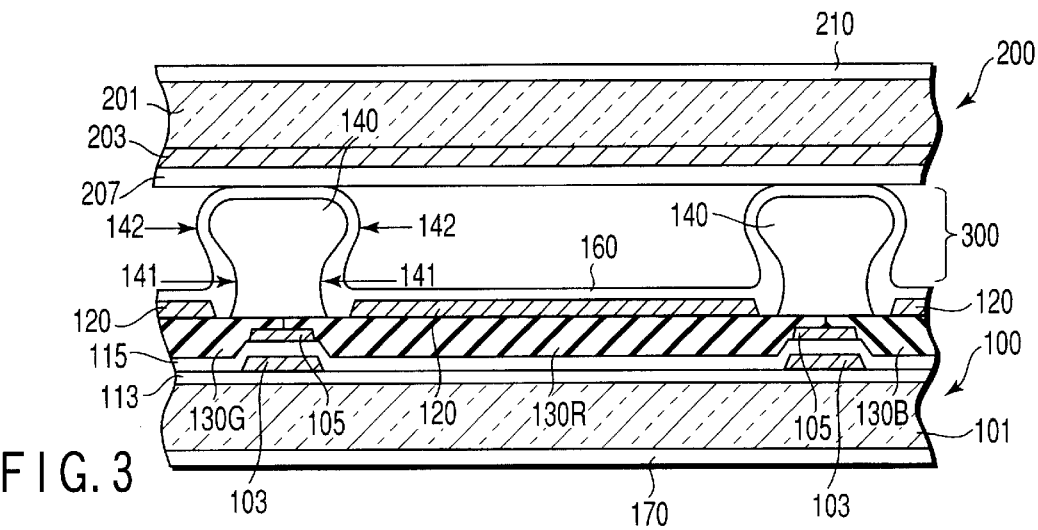
FIG. 3 is a cross sectional view along the line B—B shown in FIG. 1, which is directed to a liquid crystal display device according to a first embodiment of the present invention.

As shown in FIGS. 1 to 3, a liquid crystal display device according to a first embodiment of the present invention comprises an array substrate 100, a counter substrate 200 arranged to face the array substrate 100 with a predetermined gap provided therebetween, and a liquid crystal layer 300 held in the gap formed between the array substrate 100 and the counter substrate 200 and containing a liquid crystal material.

The array substrate 100 comprises a transparent insulating substrate, i.e., a glass substrate 101 used as a first substrate, and a wiring portion arranged on the glass substrate 101. The wiring portion includes, for example, a plurality of scanning lines 103 arranged on the glass substrate 101, signal lines 105 arranged to cross the scanning lines 103 at right angles, and a TFT 110, i.e., a thin film transistor arranged in the vicinity of the intersection between the scanning line 103 and the signal line 105 and acting as a switching element.

The array substrate 100 is provided with a pixel electrode 120 arranged in a pixel area partitioned by a wiring portion such as the scanning line 103, the signal line 105, etc. The pixel electrode 120 is formed of a transparent conductive member made of an indium-tin-oxide (ITO) and connected to the signal line 105 via the TFT 110.

The wiring portion such as the scanning line 103 and the signal line 105 is made of a material having a low resistivity and exhibiting light shielding properties such as aluminum or a molybdenum-tungsten.

The TFT 110 comprises a polycrystalline silicon (polysilicon) thin film 112 arranged on the glass substrate 101. The polysilicon thin film 112 includes a channel region 112C, a source region 112S and a drain region 112D.

Also, the TFT 110 includes a gate electrode 114, a source electrode 116S and a drain electrode 116D. The gate electrode 114 extends from the scanning line 103 arranged on a gate insulating film 113 to reach a region above the channel region 112C. The source electrode 116S extends through the gate insulating film 113 and an interlayer insulating film 115 so as to be brought into contact with the source region 112S of the polysilicon thin film 112 and is made integral with the signal line 105. Further, the drain electrode 116D extends through the gate insulating film 113 and the interlayer insulating film 115 so as to be brought into contact with the drain region 112D of the polysilicon thin film 112.

The array substrate 100 is equipped with color filter layers 130 (R, G, B) colored red (R), green (G) and blue (B) and formed on the interlayer insulating film 115 and wiring portions such as the TFT 110 for each pixel area.

The pixel electrode 120 is arranged on the color filter layer 130. The drain electrode 116D is electrically connected to the pixel electrode 120 via a through hole 118 formed in the color filter layer 130. An alignment film 160 is formed on the surface of the array substrate in a manner to cover the TFT 110 and the pixel electrode 120. The alignment film 160 permits the liquid crystal molecules contained in the liquid crystal layer 300 to be aligned in a direction substantially perpendicular to the substrate.

As shown in FIGS. 2 and 3, the counter substrate 200 comprises a counter electrode 203 arranged on a transparent insulating substrate, i.e., a glass substrate 201 used as a second substrate, and made of a transparent conductive material of ITO. The surface of the counter electrode 203 is covered with an alignment film 207 that permits the liquid crystal molecules to be aligned in a direction substantially perpendicular to the substrate.

The pixel electrode 120 and the counter electrode 203 drive the liquid crystal molecules contained in the liquid crystal layer 300.

These array substrate 100 and counter substrate 200 are bonded to each other by a sealing material (not shown) with a predetermined gap provided therebetween by columnar spacers 140. The liquid crystal layer 300 is sealed in the gap formed between the array substrate 100 and the counter substrate 200.

Polarizing plates 170 and 210 are arranged on the outer surfaces of the array substrate 100 and the counter substrate 200 such that the polarizing directions are perpendicular to each other.

As shown in FIGS. 1 and 3, the columnar spacer 140 made of a photosensitive carbon-less black resin containing a pigment is formed on the wiring portion having light shielding properties.

As shown in FIG. 3, the columnar spacer 140 includes a constricted part 141 on the side surface. Also, the largest diameter portion 142 above the constricted part 141 is positioned lower than the tip of the column. Preferably, the largest diameter portion 142 is positioned at a height less than ¾ the height of the column. The tip of the columnar spacer 140 is tapered in a forward direction as viewed from the glass substrate 101. The forward tapering denotes a roundish shape as shown in FIG. 3 or another shape. The particular shape permits the columnar spacer 140 to withstand the rubbing treatment in the step of forming the alignment film so as to prevent the columnar spacer 140 from being partly broken or peeled off. As a result, a uniform gap can be provided between the array substrate 100 and the counter substrate 200. It is also possible to permit the liquid crystal molecules to be aligned satisfactorily.

Preferably, the constricted part 141 is positioned slightly higher than the lowermost portion of the columnar spacer 140. As the result, the stability of the columnar spacer 140 becomes higher.

The largest diameter portion 142 is formed in a portion other than that portion of the columnar spacer 140 which is closest to the glass substrate 101. In other words, the largest diameter portion 142 is formed in a portion other than the lowermost portion of the columnar spacer 140. AS a result, it is possible to realize display of a high contrast free from an undesired light leakage. To be more specific, the material of the alignment film tends to be accumulated in the lowermost portion of the columnar spacer 140 so as to make the lowermost portion different from the other portions in the state of alignment and the intensity of the electric field applied thereto, thereby causing a light leakage. However, since the lowermost portion of the columnar spacer 140 is made thinner, it is possible to diminish the region in which the material of the alignment film is accumulated. In addition, where the columnar spacer 140 is formed of a light shielding material such as a black resin as in the embodiment shown in the drawing, it is possible to prevent the light leakage from the largest diameter portion 142.

A method of manufacturing the liquid crystal display device of the construction described above will now be described.

Specifically, a film formation and patterning are repeated to form the scanning line 103, the signal line 105, and the TFT 110 having a semiconductor layer of the polysilicon thin film 112 on the glass substrate 101 having a thickness of 0.7 mm.

In the next step, the entire substrate surface is coated by a spinner with an acryl resin resist having a red pigment dispersed therein and curably by irradiation with an ultraviolet light, followed by exposing the resist with light having a wavelength of 365 nm with an exposure of 100 mJ/cm². The light exposure is performed by using a photomask so as to permit the portion corresponding to the red pixel being exposed to the light. After the light exposure, the light exposed pattern is developed with a predetermined developer for 50 seconds so as to form the red color filter layer 130R.

Then, the green color filter layer 130G and the blue color filter layer 130B are formed similarly, followed by baking the color filter layers 130R, 130G and 130B at 230° C. for one hour. In this step, each of these color filter layers 130R, 130G and 130B has a thickness of 3 μm. In the step of forming these color filter layers 130R, 130G and 130B, the through hole 118 for connecting the TFT 110 to the pixel electrode 120 is formed simultaneously.

After formation of the color filter layers, an ITO film is formed by a sputtering method, followed by patterning the ITO film in a predetermined pixel pattern so as to form the pixel electrode 120 connected to the TFT 110.

In the next step, the substrate surface is coated in a thickness of 6 μm by a spinner with a photosensitive carbon-less black resin containing 35 wt % of pigment particles having a particle diameter of 0.05 to 0.2 μm. The coating thus formed is dried at 90° C. for 10 minutes, followed by exposing the coating to light having a wavelength of 365 nm by using a photomask having a predetermined pattern. The light exposure is performed with an exposure of 500 mJ/cm². Then, the light exposed pattern is developed with an alkaline aqueous solution having pH value of 11.5 so as to form columnar bodies, followed by elevating the substrate temperature to 200° C. so as to melt the columnar bodies. Further, the temperature of 200° C. is maintained for 60 minutes so as to achieve a complete curing, thereby forming the light shielding columnar spacers 140 having a height of 5 μm in predetermined positions on the light shielding wiring portion. In the step of curing the columns, it is possible to control the melting properties of the columns by controlling the temperature elevation rate. In the embodiment shown in the drawing, the temperature elevation rate is set at 200° C./min so as to form the constricted part 141 in substantially the central portion on the side surface of the column. Also, the largest diameter portion 142 is formed in a position about ¾ the height of the column.

After formation of the columnar spacer 140, the entire surface of the substrate is coated with a material of the alignment film in a thickness of 500 Å, followed by baking the coated material and, then, applying a rubbing treatment to the baked material so as to form the alignment film 160.

On the other hand, the counter substrate 200 including the counter electrode 203 and the alignment film 207 formed on the glass substrate 201 having a thickness of 0.7 μm is formed. Then, an adhesive is printed along the periphery of the alignment film 207 of the counter substrate 200 except the pouring port of a liquid crystal material, followed by forming an electrode transfer material for applying voltage from the array substrate 100 to the counter electrode 203 on a transfer electrode in the periphery of the adhesive.

In the next step, the array substrate 100 and the counter substrate 200 are arranged to permit the alignment films 160 and 207 to face each other such that the rubbing directions are perpendicular to each other, followed by heating these substrates 100 and 200 so as to cure the adhesive and, thus, to bond these substrates 100 and 200 to each other. Further, a liquid crystal material is poured into the gap between the array substrate 100 and the counter substrate 200 through the pouring port of the liquid crystal material, followed by sealing the pouring port with a resin curable upon irradiation with an ultraviolet light.

A liquid crystal display device according to a second embodiment of the present invention will now be described. The constituents of the liquid crystal display device, which are the same as those of the liquid crystal display device according to the first embodiment of the present invention, are denoted by the same reference numerals so as to avoid an overlapping description.

Figure 4:
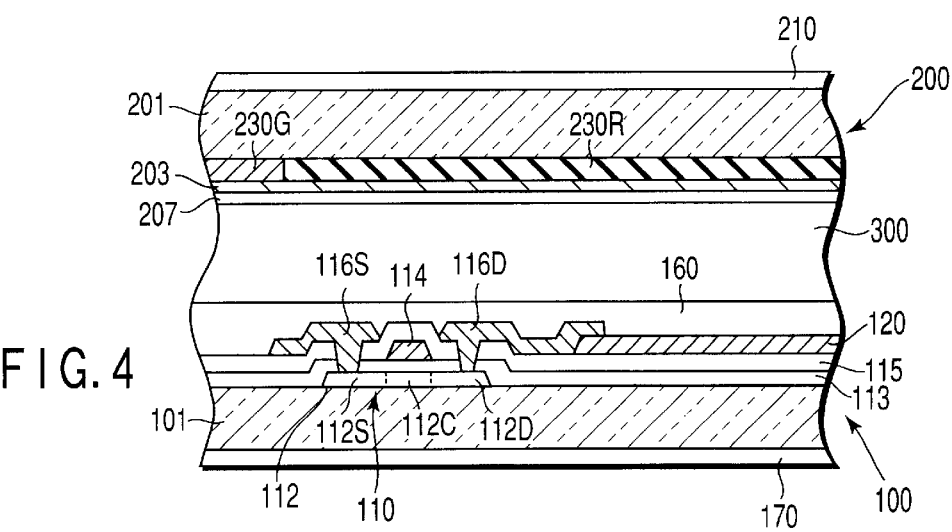
FIG. 4 is a cross sectional view along the line A—A shown in FIG. 1, which is directed to a liquid crystal display device according to a second embodiment of the present invention.
Figure 5:
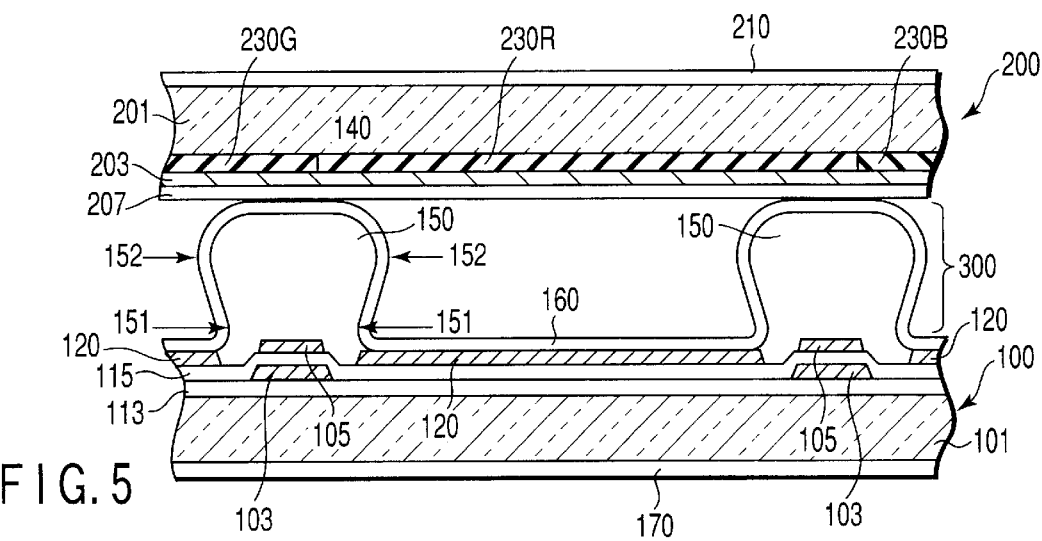
FIG. 5 is a cross sectional view along the line B—B shown in FIG. 1, which is directed to a liquid crystal display device according to a second embodiment of the present invention.

As shown in FIGS. 1, 4 and 5, the liquid crystal display device according to the second embodiment of the present invention comprises the array substrate 100, the counter substrate 200, and the liquid crystal layer 300 held in the predetermined gap between the array substrate 100 and the counter substrate 200.

The array substrate 100 comprises a transparent insulating substrate, i.e., the glass substrate 101 and the wiring portion arranged on the glass substrate 101 such as a plurality of scanning lines 103, signal lines 105 and a TFT 110. The array substrate 100 also comprises a pixel electrode 120 mounted to a pixel region partitioned by the wiring portion. The scanning line 103 and the signal line 105 collectively forming the wiring portion are made of a light shielding material having a low resistivity such as aluminum or molybdenum-tungsten. The pixel electrode 120 is electrically connected directly to the drain electrode 116D of the TFT 110. Also, the surface of the array substrate 100 is covered with the alignment film 160.

As shown in FIGS. 4 and 5, the counter substrate 200 is equipped with color filter layers 230R, 230G and 230B colored red (R), green (G) and blue (B) and arranged in the pixel regions on the glass substrate 201 and with the counter electrode 203. The surface of the counter electrode 203 is covered with the alignment film 207 for aligning the liquid crystal molecules in a direction perpendicular to the substrate.

These array substrate 100 and the counter substrate 200 are bonded to each other with a sealing material (not shown), with a predetermined gap provided by a columnar spacer 150 between the array substrate 100 and the counter substrate 200. The liquid crystal layer 300 is sealed in the gap formed between the array substrate 100 and the counter substrate 200.

As shown in FIGS. 1 and 5, the columnar spacer 150 formed of a photosensitive carbon-less black resin containing a pigment is arranged on the light shielding wiring portion.

As shown in FIG. 5, the columnar spacer 150 includes a constricted part 151 on the side surface. Also, the largest diameter portion 152 above the constricted part 151 in the direction of the height of the column is positioned below the tip of the column. Preferably, the largest diameter portion 152 should be positioned in the height less than ¾ the height of the column. To be more specific, the largest diameter portion 152 is shaped roundish and defined by combination of at least one radius of curvature in a cross section along the direction of the height as shown in FIG. 5. As a result, the columnar spacer 150 is capable of withstanding the rubbing treatment in the step of forming the alignment film, making it possible to provide a uniform gap between the array substrate 100 and the counter substrate 200. It is also possible to realize a satisfactory alignment.

A method of manufacturing the liquid crystal display device of the construction described above will now be described.

Specifically, a film formation and patterning are repeated to form the scanning line 103, the signal line 105, the TFT 110 having a semiconductor layer of the polysilicon film 112, and the pixel electrode 120 on the glass substrate 101 having a thickness of 0.7 mm.

In the next step, the substrate surface is coated by a spinner in a thickness of 6 µm with a photosensitive carbonless black resin containing 35 wt % of pigment particles having a particle diameter of 0.05 to 0.2 µm. Then, the coating is dried at 90° C. for 10 minutes, followed by subjecting the coating to a light exposure by using a photomask of a predetermined pattern. For the light exposure treatment, the coating is exposed to light having a wavelength of 365 nm, with an exposure of 500 mJ/cm². After the light exposure step, the light exposed pattern is developed with an alkaline aqueous solution having a pH value of 11.5 so as to form columnar bodies. Then, the substrate temperature is elevated to 200° C. so as to melt the columnar bodies. The elevated temperature of 200° C. is maintained for 60 minutes so as to achieve a complete curing, thereby forming the light shielding columnar spacer 150 having a height of 5 µm in a predetermined position on the light shielding wiring portion. In curing the columnar body, the temperature elevation rate is set at 200° C./min so as to form the constricted part 151 in substantially the central portion of the side surface of the columnar body and to form the largest diameter portion 152 in the height substantially ¾ the height of the columnar body.

In the next step, the entire surface of the substrate is coated with a material of the alignment film in a thickness of 500 Å, followed by baking the coating and, then, applying a rubbing treatment to the baked coating so as to form the alignment film 160.

On the other hand, the counter substrate 200 equipped with the color filters 230R, 230G and 230R, the counter electrode 203 and the alignment film 207 on the glass substrate 201 having a thickness of 0.7 µm is formed. Then, an adhesive is printed along the periphery of the alignment film 207 of the counter substrate 200 except the pouring port of a liquid crystal material, followed by forming an electrode transfer material for applying voltage from the array substrate 100 to the counter electrode 203 on an transfer electrode in the periphery of the adhesive.

In the next step, the array substrate 100 and the counter substrate 200 are arranged to permit the alignment films 160 and 207 to face each other such that the rubbing directions are perpendicular to each other, followed by heating these substrates 100 and 200 so as to cure the adhesive and, thus, to bond these substrates 100 and 200 to each other. Further, a liquid crystal material is poured into the gap between the array substrate 100 and the counter substrate 200 through the pouring port of the liquid crystal material, followed by sealing the pouring port with a resin curable upon irradiation with an ultraviolet light.

In each of the first and second embodiments described above, the columnar spacer is formed on the array substrate 100. Alternatively, it is also possible to form the columnar spacer on the counter substrate 200.

Also, in each of the embodiments described above, the columnar spacer is mounted above the intersection between the scanning line 103 and the signal 105. However, it is possible for the columnar spacer to be mounted above any of the scanning line 103 and the signal line 105. It is also possible for the columnar spacer to be mounted to a portion other than these wirings. Further, the columnar spacer can be mounted above the TFT 110 or above an auxiliary capacitor line for forming an auxiliary capacitor (not shown).

As described above, the present invention provides a liquid crystal display device achieving a good display performance and capable of preventing the manufacturing yield from being lowered and a method of manufacturing the liquid crystal display device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device, comprising:
   a first substrate;
   a columnar spacer formed on said first substrate and exhibiting light shielding properties;
   an alignment film formed to cover at least a part of said columnar spacer;
   a second substrate arranged to face the first substrate with a predetermined gap provided by the columnar spacer between the first and second substrates; and
   a liquid crystal material arranged within said gap;
   wherein said columnar spacer is tapered from the second substrate towards the first substrate in that portion of said columnar spacer which is positioned closest to said second substrate and has the largest diameter portion in the region other than that region of the columnar spacer which is positioned closest to said first substrate, the largest diameter portion having a shape defined by at least one radius of curvature, in a cross section taken along a height direction of the columnar spacer.

2. The liquid crystal display device according to claim 1, wherein said columnar spacer is colored black.

3. The liquid crystal display device according to claim 1, wherein an electrode for driving said liquid crystal material is arranged between said first substrate and said columnar spacer.

4. The liquid crystal display device according to claim 1, wherein said first substrate comprises a wiring portion made of a metal and a switching element.

5. The liquid crystal display device according to claim 4, wherein said columnar spacer is arranged above said wiring portion.

6. A method of manufacturing a liquid crystal display device, comprising:
   a first step of forming a columnar spacer on a first substrate;
   a second step of forming an alignment film on said first substrate on which said columnar spacer is formed;
   a third step of applying a rubbing treatment to said alignment film; and
   a fourth step of arranging said first substrate and said second substrate to face each other and arranging a liquid crystal material in a gap formed between said first and second substrates by said columnar spacer;
   wherein said columnar spacer in said first step is tapered from the second substrate towards the first substrate in that portion of said columnar spacer which is positioned closest to said second substrate and has the largest diameter portion in the region other than that region of the columnar spacer which is positioned closest to said first substrate, the largest diameter portion having a shape defined by at least one radius of curvature, in a cross section taken along a height direction of the columnar spacer.

7. The method of manufacturing a liquid crystal display device according to claim 6, further comprising the step of forming an electrode for driving said liquid crystal material on said first substrate before said first step.

8. The method of manufacturing a liquid crystal display device according to claim 6, wherein said columnar spacer is made of a light shielding material.

* * * * *